United States Patent
Buttler et al.

(10) Patent No.: US 11,090,662 B2
(45) Date of Patent: Aug. 17, 2021

(54) WIRELESS HYDROCYCLONE ROPING AND WEAR MANAGEMENT SYSTEM

(71) Applicant: FLSmidth A/S, Valby (DK)

(72) Inventors: Barry Michael Buttler, Oro Valley, AZ (US); Matthew Peter Bochicchio, Tucson, AZ (US); Jon Robert Culbertson, Oro Valley, AZ (US); Robert Bennett Singer, Tucson, AZ (US)

(73) Assignee: FLSmidth A/S

( * ) Notice: Subject to any disclaimer, the term of this patent is extended or adjusted under 35 U.S.C. 154(b) by 34 days.

(21) Appl. No.: 16/324,442

(22) PCT Filed: Aug. 1, 2017

(86) PCT No.: PCT/IB2017/054685
§ 371 (c)(1),
(2) Date: Feb. 8, 2019

(87) PCT Pub. No.: WO2018/029574
PCT Pub. Date: Feb. 15, 2018

(65) Prior Publication Data
US 2019/0176167 A1 Jun. 13, 2019

Related U.S. Application Data

(60) Provisional application No. 62/397,757, filed on Sep. 21, 2016, provisional application No. 62/373,068, filed on Aug. 10, 2016.

(51) Int. Cl.
*B04C 11/00* (2006.01)
*G08C 17/04* (2006.01)
(Continued)

(52) U.S. Cl.
CPC ............... *B04C 11/00* (2013.01); *B04C 5/24* (2013.01); *G01D 5/145* (2013.01); *G01H 1/00* (2013.01);
(Continued)

(58) Field of Classification Search
CPC .......... B04C 11/00; B04C 5/24; G08C 17/02; G08C 17/04; G08C 2201/12; G01H 1/00; G01D 5/145
See application file for complete search history.

(56) References Cited

U.S. PATENT DOCUMENTS

| 5,602,744 A * | 2/1997 | Meek ............ G06Q 50/06 |
| | | 705/412 |
| 6,874,364 B1 * | 4/2005 | Campbell ............ G01H 3/12 |
| | | 73/593 |

(Continued)

FOREIGN PATENT DOCUMENTS

| GB | 2486799 A | 6/2012 |
| WO | 01/03840 A1 | 1/2001 |

OTHER PUBLICATIONS

Reaves, B. et. al. 2012 "Analysis and mitigation of vulnerabilities in short-range wireless communications for industrial control systems". int. J. crit. Infra. prot. 154-174 (Year: 2012).*

(Continued)

*Primary Examiner* — Liam Royce
(74) *Attorney, Agent, or Firm* — Jeffrey A. Sharp

(57) ABSTRACT

A new and improved hydrocyclone roping and wear management system and method for its use are provided. The system includes one or more wireless electronic roping sensors and/or one or more wireless electronic wear sensors disposed in communication with one or more hydrocyclones, along with a wireless electronic controller. The system is capable of wirelessly detecting roping and/or wear conditions within one or more hydrocyclone separators (Continued)

during their operation, communicating electronic data corresponding to the roping and/or wear conditions to an associated hydrocyclone control system, and causing adjustments in controlling operational parameters for the hydrocyclones. The associated method includes steps for wirelessly acquiring roping and/or wear condition data using the wireless electronic controller and delivering the data to the hydrocyclone control system. The system and method provide for improved roping detection and wear maintenance scheduling, and improved adjustment of undesirable roping and wear conditions.

10 Claims, 3 Drawing Sheets

(51) Int. Cl.
G01H 1/00 (2006.01)
G01D 5/14 (2006.01)
B04C 5/24 (2006.01)
G08C 17/02 (2006.01)
(52) U.S. Cl.
CPC ............ *G08C 17/02* (2013.01); *G08C 17/04* (2013.01); *G08C 2201/12* (2013.01)

(56) References Cited

U.S. PATENT DOCUMENTS

| 6,945,098 | B2 | 9/2005 | Olson | |
|---|---|---|---|---|
| 6,983,850 | B2 | 1/2006 | Olson et al. | |
| 2002/0113692 | A1* | 8/2002 | Normann | B60C 23/0408 340/442 |
| 2014/0151274 | A1* | 6/2014 | Hadfield | B04C 11/00 210/85 |
| 2014/0375461 | A1* | 12/2014 | Richardson | A61B 5/681 340/573.7 |
| 2017/0239594 | A1* | 8/2017 | Bowers | B04C 11/00 |

OTHER PUBLICATIONS

Shahin Farahani, Zigbee Wireless Networks and Transceivers, Feb. 13, 2009, 364 pages.
The International Search Report and Written Opinion dated Nov. 23, 2017, 14 pages.
Krebs Smartcyclone (TM), Feb. 22, 2008, retrieved from the internet: http://www.flsmidth.com/~/media/PDFFiles/Liquid-SolidSeparation/Hydrocyclones/04206SmartCycloneSpecificationSheet.ashx.
"Krebs Smart Cyclone(TM)" Feb. 22, 2008 URL: http://www.flsmidth.com/~/media/PDF Files/Liquid-Solid Separation/Hydrocyclones/04206SmartCycloneSpecificationSheet.ashx.

* cited by examiner

WIRELESS HYDROCYCLONE ROPING AND WEAR MANAGEMENT SYSTEM

CROSS-REFERENCE TO RELATED APPLICATIONS

This is an International Application which claims the benefit of U.S. Provisional Patent Application No. 62/373,068, filed 10 Aug. 2016 and U.S. Provisional Patent Application No. 62/397,757, filed 21 Sep. 2016, the contents of which are hereby incorporated by reference, in their entirety, for any and all purposes, as if fully set forth herein.

FIELD OF THE INVENTION

This invention pertains generally to the use of hydrocyclone separators for liquid/solid separation in the minerals processing, power and coal industries. In particular, it pertains to the detection and management of hydrocyclone wear and a condition known as roping in the underflow discharge of a hydrocyclone, through the use of a wireless wear and roping detector and controller system.

BACKGROUND OF THE INVENTION

Hydrocyclones used in the minerals processing, power and coal industries are exposed to flowing liquid/solid slurries that cause abrasive wear on interior wall surfaces of the separation chamber and inlet/outlet ports. Excessive amounts of wear can result in unacceptably high circulating loads within a grinding circuit and poor separation efficiency in general. For these reasons, hydrocyclones require periodic maintenance to repair and/or replace components subject to wear, including both individual hydrocyclone sections and applied interior surface wear liners. The need for such maintenance results in downtime for individual hydrocyclone units and manifold systems comprising groups of individual units, which can slow or stop the desired separation processes. When this maintenance can be performed on a planned schedule, the downtime, inconvenience, effort and cost associated with the maintenance is reduced, time and cost budgeting and predictability are improved, overall process visibility is enhanced and the maintenance can take advantage of available rebuild programs. Also, performing such maintenance at a time before wear is considered unacceptably high tends to extend the overall wear life of the hydrocyclone units, delaying replacement time and cost.

Wear in hydrocyclones is typically detected and monitored through the use of wired wear sensors embedded within or sandwiched between liners of the cyclone walls in areas of anticipated wear. The wear sensors communicate signals reporting the slow abrasion of the liner material during operation to corresponding node units for each cyclone via suitable cables connecting the sensors to each cyclone's corresponding node control box. The node units, in turn, feed operating data to manifold controllers via suitable cables, where signal data is accumulated and transmitted at regular intervals to a dedicated control room computer workstation. Although it will be appreciated that any suitable type of wear sensor can be used in this field, an example of this type of wear sensor is shown and described in Applicant's prior U.S. Pat. No. 6,945,098, and as reproduced in FIG. 1.

That system, however, includes the disadvantages of requiring nodes for each cyclone and a number of central controllers, suitable cables from each wear sensor to each corresponding node, suitable cables from the nodes to the central controllers, and additional wiring from the controllers to the control room workstation, along with cable trays or other provisions for safely locating and accommodating the required wiring. In addition, such wired sensors must typically be disconnected and/or removed during cyclone maintenance while taking care not to damage the sensors or their wiring, and then reinstalled and reconnected after the maintenance is completed. Accordingly, it would be advantageous to have wireless electronic wear sensors that could replace the existing wired sensors, eliminate the need for node units corresponding to the various cyclones, reduce the number of required manifold controllers, eliminate the wiring required for connecting these items and provide wireless detection and communication of wear data from the sensors to the manifold controllers for forwarding to the control room workstation, either directly through suitable cables or through a suitable intermediary wireless electronic device.

When a hydrocyclone of the type typically employed in the minerals processing, power or coal industries is operating normally, a coarser-solid slurry is discharged through the underflow outlet at the bottom of the separation chamber and a finer-solid slurry is discharged through the overflow outlet at the top, as shown and described in Applicant's prior U.S. Pat. No. 6,983,850. The underflow discharge normally exits from the apex at the bottom of the chamber in the form of a conical spray with an included angle greater than about 20 degrees, as shown in FIG. 2. A splash skirt (not shown) is typically employed below the apex of the hydrocyclone to contain and direct the flow downward and to reduce splashing and misting.

As defined in the art, a roping condition occurs when the amount of solids reporting to the underflow outlet increases to the point where the discharge rate through the apex limits the flow. As a result, coarse solids begin to build up in the separation chamber and pass through the overflow, the internal air core in the separation chamber collapses, and the underflow discharge becomes a tight cylinder or rope of coarse material, as shown in FIG. 3. If this roping condition is not corrected, the underflow can become completely obstructed, and the cyclone will pass the entire flow through the overflow outlet. If not detected and corrected promptly, a roping condition in a hydrocyclone can last for hours and can significantly reduce processing throughput. In addition, it can redirect coarse solids normally intended for being sent to a mill via the hydrocyclone's underflow output through the hydrocyclone's overflow to a flotation cell. Such a situation can accumulate excessive coarse solids in the flotation cell, requiring shutdown and cleaning, which can be very expensive and time-consuming, and can significantly delay the intended processing. For these reasons, prompt detection and correction of roping conditions significantly improves the efficiency of separation processes such as mineral extraction and recovery.

In closed-circuit grinding applications, the cyclone underflow density is preferably kept high so that a minimum amount of water accompanies the coarse solids. That is done by sizing the apex, or orifice, to limit the flow to the solids plus no more than about 50% water. If the apex is too large, more water will report to the underflow with a large quantity of fine solids entrained in it. If sent back to a mill, those fine solids will limit classification efficiency as well as new feed capacity. At the same time, with variable tonnages and ore hardness, it is difficult to operate the cyclones with maximum underflow density while at the same time avoiding roping and the problems associated with it.

Wired roping sensors have been used to detect roping conditions in hydrocyclones. Although it will be appreciated that any suitable type of roping sensor can be used in this field, Applicant's prior U.S. Pat. No. 6,983,850 introduced a hydrocyclone roping detector and method using a wired ultrasonic sensor mounted on the splash skirt at the underflow outlet of a hydrocyclone to detect a change in the underflow discharge from the normal conical shape in which the discharge impacts upon the splash skirt to a more cylindrical shape associated with roping, as shown in FIG. 4. Alternately, a similar wired roping sensor can be mounted in communication with a hydrocyclone's overflow discharge or a manifold discharge to detect changes in those streams, which would provide variations in signal output upon detecting a higher fraction of coarse solids exiting from either outlet, also indicating a roping condition. In similar manner as for the wired wear sensors, the wired roping sensors generate signals that report changes in the underflow, overflow or manifold discharge characteristics during operation to corresponding node units for each cyclone via waterproof cables connecting the sensors to each cyclone's corresponding node control box. Again, the node units, in turn, feed operating data to manifold controllers via suitable cable, where signal data is accumulated and transmitted at regular intervals to a dedicated control room computer workstation. An example of this type of arrangement is shown in FIG. 5. Variations in signals sent from these wired roping sensors to the control room workstation are interpreted by control room operators so that they may adjust the operational parameters of the hydrocyclone(s) such as flow rate, feed pressure, water addition, on/off operation and number of operating hydrocyclones to restore the hydrocyclone(s) to a non-roping condition.

However, as with wired wear sensors, wired roping sensors also carry the disadvantages of requiring nodes for each cyclone and a number of central controllers, suitable cables from each wear sensor to each corresponding node, suitable cables from the nodes to the central controllers, and additional wiring from the controllers to the control room workstation, along with cable trays or other provisions for safely locating and accommodating the required wiring. Again, such wired sensors must typically be disconnected and/or removed during cyclone maintenance while taking care not to damage the sensors or their wiring, and then reinstalled and reconnected after the maintenance is completed. Accordingly, it would be advantageous to have wireless electronic roping sensors that could replace the existing wired sensors, eliminate the need for node units corresponding to the various cyclones, reduce the number of required manifold controllers, reduce the wiring required for connecting these items and provide wireless detection and communication of roping condition data from the sensors to the manifold controllers for forwarding to the control room workstation, either directly or through a suitable intermediary electronic wireless device.

For the above reasons, there exists a need for a wireless hydrocyclone roping and wear management system that is able to reduce or eliminate the wired wear and roping sensors, accompanying node units, manifold controllers and extensive wiring arrangements common to prior hydrocyclone control systems, while transmitting desired wear and roping condition data wirelessly to manifold controllers and control room workstations. The subject matter disclosed herein at least partially satisfies this need.

SUMMARY OF THE INVENTION

It is, in general, an object of the invention to provide a new and improved hydrocyclone roping and wear management system and method for its use. Another object of the invention is to provide a roping and wear management system and method of the above character that overcomes the limitations and disadvantages of the prior art.

These and other objects are achieved in accordance with the invention by providing a hydrocyclone management system capable of wirelessly detecting normal (non-roping), transitional, and roping conditions within one or more hydrocyclone separators during their operation, and communicating electronic data corresponding to such normal, transitional, and roping conditions within the hydrocyclone separator(s) to an associated hydrocyclone control system operable for monitoring and controlling operational parameters of the hydrocyclone separator(s). In this form, the management system comprises one or more wireless electronic roping sensors disposed in communication with a flow region of the hydrocyclone separator(s) and operable for detecting normal, transitional, and roping conditions within the hydrocyclone separator(s), creating electronic data indicative of these conditions and transmitting electronic data indicative of these conditions wirelessly for delivery to the associated hydrocyclone control system. The management system also comprises an electronic wireless controller operable for wirelessly receiving electronic data indicative of these conditions transmitted from one or more wireless electronic roping sensors, and operable for wirelessly delivering the electronic data indicative of the conditions to the hydrocyclone control system.

These and other objects are also achieved in accordance with the invention by providing a hydrocyclone management system capable of wirelessly detecting a wear condition within one or more hydrocyclone separators during their operation, and communicating electronic data corresponding to the wear condition within the hydrocyclone separator(s) to an associated hydrocyclone control system operable for monitoring and controlling operational parameters of the hydrocyclone separator(s). In this form, the management system comprises one or more wireless electronic wear sensors disposed in communication with one or more internal wear regions of the hydrocyclone separator(s), and operable for detecting a wear condition within the internal wear region(s), creating electronic data indicative of the wear condition and transmitting electronic data indicative of a wear condition wirelessly for delivery to the associated hydrocyclone control system. The management system also comprises an electronic wireless controller operable for wirelessly receiving electronic data indicative of a wear condition transmitted from one or more wireless electronic wear sensors, and operable for delivering the electronic data indicative of the wear condition to the hydrocyclone control system.

These and other objects are also achieved in accordance with the invention by providing a hydrocyclone management system capable of wirelessly detecting normal, transitional, and roping conditions and a wear condition within one or more hydrocyclone separators during their operation, and communicating electronic data corresponding to both the roping condition and the wear condition within the hydrocyclone separator(s) to an associated hydrocyclone control system, each as summarized above.

These and other objects are also achieved in accordance with the invention by providing a method of wirelessly detecting normal, transitional, and roping conditions within a hydrocyclone separator during its operation, and communicating electronic data corresponding to the roping condition to an associated hydrocyclone control system. In this form, the method comprises the steps of: providing a wireless electronic roping sensor disposed in communication with a flow region of the hydrocyclone separator, and operable for detecting normal, transitional, and roping conditions within the hydrocyclone separator, creating electronic data indicative of these conditions and transmitting electronic data indicative of these conditions wirelessly for delivery to the associated hydrocyclone control system; providing an electronic wireless controller operable for wirelessly receiving electronic data indicative of normal, transitional, and roping conditions transmitted from the wireless electronic roping sensor, and operable for delivering the electronic data indicative of these conditions to the hydrocyclone control system; placing the electronic wireless controller in proximity to the wireless electronic roping sensor, so as to receive the electronic data created by, and transmitted by, the wireless electronic roping sensor; and causing the electronic wireless controller to deliver the electronic data indicative of normal, transitional, and roping conditions received from the wireless electronic roping sensor to the associated hydrocyclone control system.

These and other objects are also achieved in accordance with the invention by providing a method of wirelessly detecting a wear condition within a hydrocyclone separator during its operation, and communicating electronic data corresponding to the wear condition to an associated hydrocyclone control system. In this form, the method comprises the steps of: providing a wireless electronic wear sensor disposed in communication with an internal wear region of the hydrocyclone separator, and operable for detecting a wear condition within the internal wear region, creating electronic data indicative of a wear condition and transmitting electronic data indicative of a wear condition wirelessly for delivery to the associated hydrocyclone control system; providing an electronic wireless controller operable for wirelessly receiving electronic data indicative of a wear condition transmitted from the wireless electronic wear sensor, and operable for delivering the electronic data indicative of a wear condition to the hydrocyclone control system; placing the electronic wireless controller in proximity to the wireless electronic wear sensor, so as to receive the electronic data created by, and transmitted by, the wireless electronic wear sensor; and causing the electronic wireless controller to deliver the electronic data indicative of a wear condition received from the wireless electronic wear sensor to the associated hydrocyclone control system.

These and other objects are also achieved in accordance with the invention by providing a method of wirelessly detecting normal, transitional, and roping conditions within a plurality of hydrocyclone separators during their operation, and communicating electronic data corresponding to these conditions to an associated hydrocyclone control system, as summarized above. In this form, the method further comprises sequentially placing the electronic wireless controller in proximity to each of the wireless electronic roping sensors, so as to receive said electronic data created by, and transmitted by, each of the wireless electronic roping sensors.

These and other objects are also achieved in accordance with the invention by providing a method of wirelessly detecting a wear condition within a plurality of hydrocyclone separators during their operation, and communicating electronic data corresponding to a wear condition to an associated hydrocyclone control system, as summarized above. In this form, the method further comprises sequentially placing the electronic wireless controller in proximity to each of the wireless electronic wear sensors, so as to receive said electronic data created by, and transmitted by, each of the wireless electronic wear sensors.

DETAILED DESCRIPTION OF THE INVENTION

Figure 1:
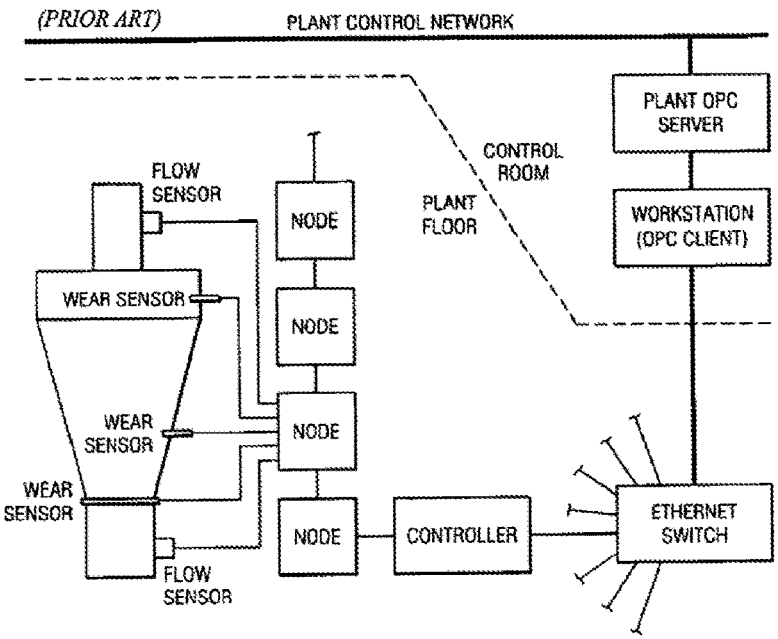
FIG. 1 is a schematic diagram showing the use of wired hydrocyclone wear sensors and their control environment according to the prior art.
Figure 2:
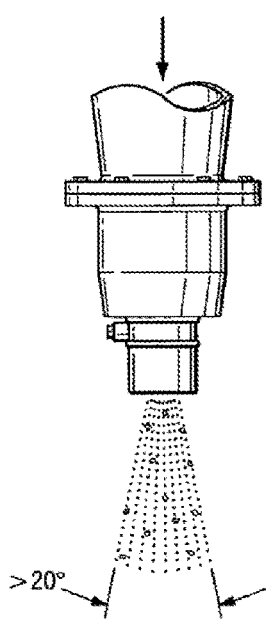
FIG. 2 is a fragmentary elevational view illustrating a normal condition in the underflow discharge of a hydrocyclone without a splash skirt according to the prior art.
Figure 3:
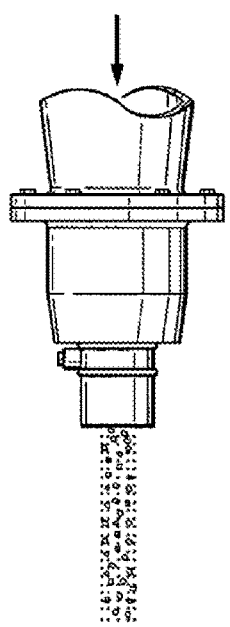
FIG. 3 is a fragmentary elevational view illustrating a roping condition in the underflow discharge of a hydrocyclone without a splash skirt according to the prior art.
Figure 4:
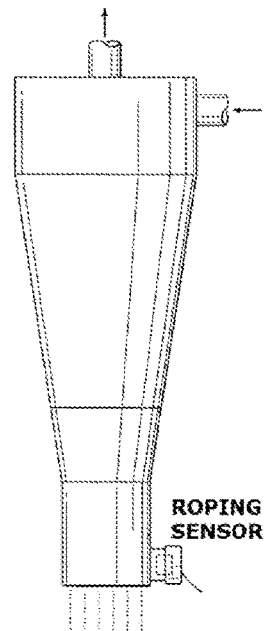
FIG. 4 is a side elevational view of a hydrocyclone having a wired roping sensor mounted in proximity to the underflow discharge of a hydrocyclone according to the prior art.
Figure 5:
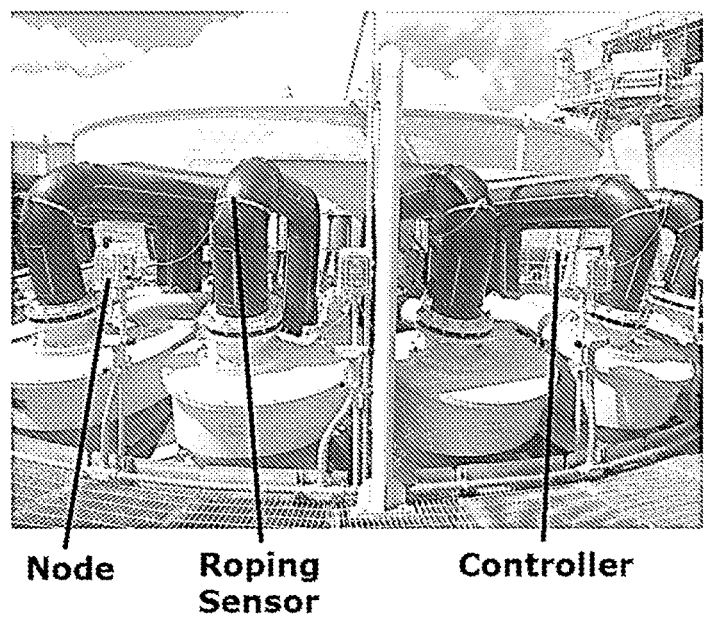
FIG. 5 is a side elevational view of a hydrocyclone having wired roping sensors mounted in proximity to the overflow discharges of multiple hydrocyclones, each wired roping sensor connected by wire to a corresponding node unit, which in turn are each connected by wire to a corresponding controller, according to the prior art.
Figure 6:
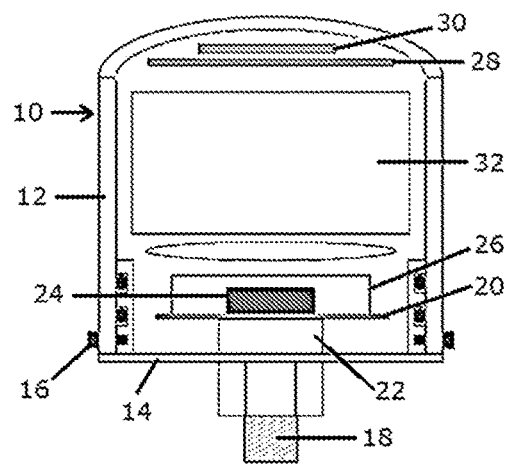
FIG. 6 is a cross-sectional view of a wireless electronic roping sensor according to the present invention.
Figure 7:
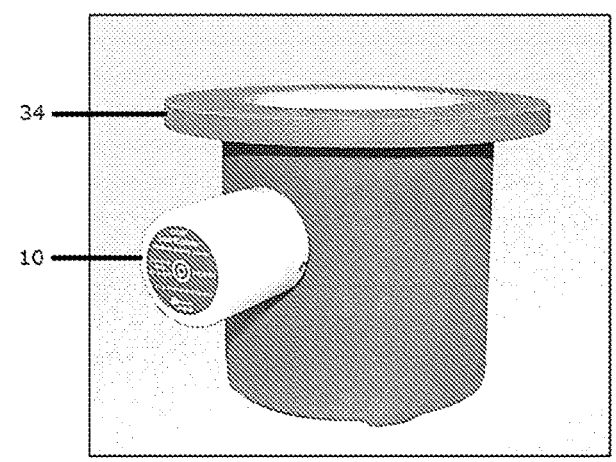
FIG. 7 is a perspective view of a wireless electronic roping sensor mounted upon a hydrocyclone measurement chamber according to the present invention.

In accordance with the present invention, a hydrocyclone management system is provided that is capable of wirelessly detecting normal, transitional, and roping conditions and/or a wear condition within a hydrocyclone separator or a group of hydrocyclones during operation. The hydrocyclone management system is further capable of communicating electronic data corresponding to normal, transitional, and roping conditions and/or a wear condition within each hydrocyclone separator to an associated hydrocyclone control system that is operable for monitoring and controlling operational parameters of each hydrocyclone separator. As part of the hydrocyclone management system, FIG. 6 shows a wireless electronic roping sensor, generally at 10, which includes a housing 12 of plastic or other suitable material through which electronic signals can penetrate. The housing 12 is mounted upon a front plate 14 of stainless steel or other suitable material by fasteners 16, such as Allen-head locking screws or other suitable fasteners, so as to preferably create a substantially waterproof seal relative to the housing 12. A threaded stud 18 protrudes from the front plate 14, for mounting the wireless electronic roping sensor 10 fixedly upon a measurement chamber representing a flow region of a hydrocyclone, shown at 34 in FIG. 7. Typically, such a flow region for a hydrocyclone separator is represented by an underflow outlet, an overflow outlet or a manifold discharge outlet, although it will be appreciated that the wireless electronic roping sensor 10 may be placed at any suitable location for sensing flow conditions within a hydrocyclone.

The wireless electronic roping sensor 10 further includes an analog printed circuit board (PCB) 20 that is bonded to a pedestal 22 protruding from an interior surface of the front plate 14, for providing electrical isolation from the exterior environment. A piezo element 24 is attached to the analog printed circuit board (PCB) 20 within a shield 26 of metal or other suitable material for detecting changes in sound or vibration emanating from the flow through the measurement chamber 34 of the type that would indicate a roping condition taking place within the hydrocyclone. The wireless electronic roping sensor 10 further includes a digital electronics printed circuit board (PCB) 28 and a radio frequency (RF) transmitter unit 30, and a battery 32 (wiring not shown) for powering the electronics within the wireless electronic roping sensor 10. In this arrangement, the wireless electronic roping sensor 10 is operable for detecting normal, transitional, and roping conditions within a hydrocyclone separator upon which it is mounted, creating electronic data indicative of the roping condition and transmitting such electronic data indicative of the roping condition wirelessly, outside of the housing 12, for being received and delivered to an associated hydrocyclone control system. Preferably, the battery 32 is of suitable design and capacity to last for a significant time before requiring recharging or replacement, such as over one year. Also, each wireless electronic roping sensor 10 preferably includes its own electronic identification corresponding to a particular identified hydrocyclone separator location upon which it is applied.

The wireless electronic roping sensor 10 is typically manufactured, shipped and incorporated into the hydrocyclone management system in a dormant "standby" mode to preserve battery life, and is capable of being activated or "awakened" when a suitable controller or other electronic device is placed in close proximity to, or otherwise initiates communication with, the wireless electronic roping sensor 10, as discussed in further detail below. A dormant, "standby" mode is used in the wireless electronic roping sensor 10 to conserve battery life when the sensor is not in active use, by not requiring electronic components in the wireless electronic roping sensor 10 to always be powered. The activation or "awakening" of the wireless electronic roping sensor 10 may be performed by any suitable electronic, magnetic or other means, also known as a trigger, including exposure to a magnetic field or electronic signal provided or transmitted by an electronic controller or other control device. Accordingly, the wireless electronic roping sensor 10 includes a specialized micro-power sensor (not shown) for detecting the magnetic field or electronic signal provided by the electronic controller or other control device. Upon activation, the wireless electronic roping sensor 10 enters into a synchronization or linking mode with the electronic controller or other control device, to coordinate communications information, radio frequency bands, and sensor-specific information. After synchronizing or linking, the transmission of electronic roping data to the electronic controller or other control device begins, also as discussed in further detail below. If the wireless electronic roping sensor 10 is taken out of active service it can be returned to the power-saving dormant storage mode by commands from the electronic controller or other control device. The dormant storage ("standby") mode used in the present invention is unique, especially in the sense that it utilizes non-contact sensors to exit this battery saving condition. It is also unique in that it utilizes non-contact switches that are activated by one or another type of electromagnetic radiation, and therefore no opening, physical penetration or electrical connection is required through the sealed enclosure of the wireless electronic roping sensor 10. Accordingly, this mode operates differently from a typical timed "sleep" mode used in many electronic devices.

Figure 8:
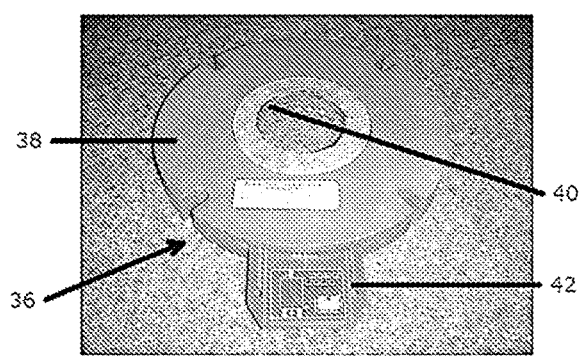
FIG. 8 is a perspective view of a wireless electronic wafer-style wear sensor according to the present invention.
Figure 11:
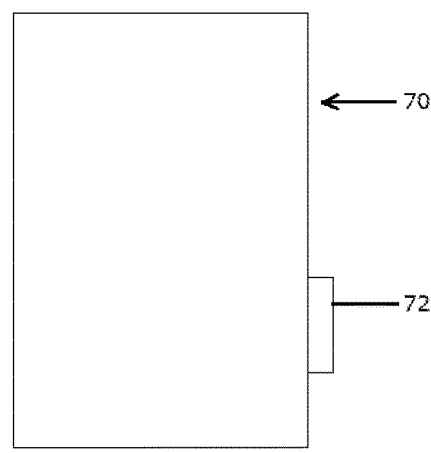
FIG. 11 is a schematic diagram showing the use of an electronic sensor operable for detecting an operational condition of consumable equipment in the mining, minerals processing and other industries.

It will be appreciated that this configuration of initial dormancy, subsequent activation and return to dormancy for the wireless electronic roping sensor 10 may be incorporated into other types of sensors or detectors used in other types of equipment in the mining, minerals processing and other industries. Such equipment may include wear or performance sensors for consumable items such as mill liners, flotation cells, rotor/stator components, draft tubes in flotation cells, grinding mill discs, attrition mills, pump impellers, filter media and filter plates. As shown generally in FIG. 11, any kind of consumable equipment of the above and/or other types in the above industries, shown at 70, may be fitted with one or more electronic sensors 72 operable for detecting an operational condition of the equipment, creating electronic data indicative of the operational condition and transmitting the electronic data indicative of the operational condition wirelessly for delivery to an associated control system. As before, the sensor is preferably provided in a standby condition and is operable for being activated from the standby condition prior to transmitting the electronic data indicative of the operational condition, by exposure to a trigger such as a magnetic field or an electronic signal. Referring now to FIG. 8, the hydrocyclone management system may include a wafer-style wireless electronic wear sensor, generally at 36, which includes a housing 38, an interior annulus 40 and an electronic printed circuit board (PCB) 42. The wafer-style wear sensor is a robust sensor preferred for detecting wear upon an apex section of a hydrocyclone, and where wear is expected to be asymmetric. When disposed in communication with an internal wear region of a hydrocyclone separator, slurries flowing through the interior annulus 40 wear away over time the material from which the annulus 40 is made, breaking concentric electrical circuits embedded in the annulus material as wear occurs, providing information about the wear experienced in that region of the hydrocyclone interior wall surface. In similar manner as for the wireless electronic roping sensor 10, the wireless electronic wear sensor 36 is also powered by a battery (not specifically shown) and includes electronics including a radio frequency (RF) transmitter (not specifically shown) on its electronic printed circuit board (PCB) 42. Those electronics enable the wireless electronic wear sensor 36 to detect the wear of the interior annulus 40, (which represents the wear condition within that internal wear region of the hydrocyclone separator), create electronic data indicative of the wear condition and transmit electronic data indicative of the wear condition wirelessly for being received and delivered to an associated hydrocyclone control system. Again, the battery within the wireless electronic wear sensor 36 should preferably be of suitable design and capacity to last for a significant time before requiring recharging or replacement, such as over one year. Again, each wireless electronic wear sensor 36 preferably includes its own electronic identification corresponding to a particular identified hydrocyclone separator location upon which it is applied.

Figure 9:
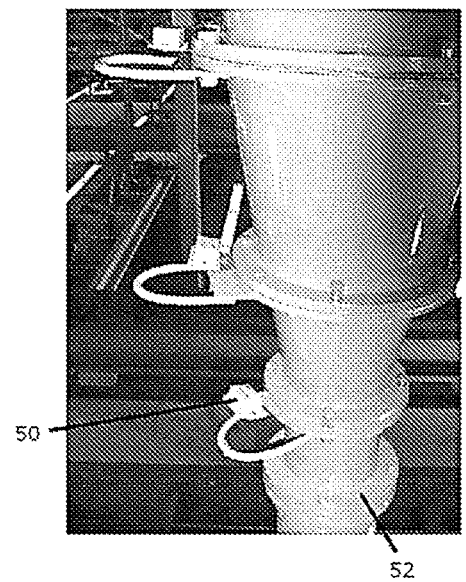
FIG. 9 is a perspective view of a wireless electronic probe-style wear sensor disposed upon a hydrocyclone according to the present invention.

Referring now to FIG. 9, the hydrocyclone management system may include a probe-style wireless electronic wear sensor, at 50, disposed upon a hydrocyclone 52. The probe-style wireless electronic wear sensor 50 includes thin printed circuit boards (PCBs) that are sized to fit between various-sized hydrocyclone liner sections. The probe-style design allows for "point-specific" wear detection which allows it to be used for liner sections with various inner diameters, which differs from the standard annulus design mentioned above. The probe-style wear sensor is a convenient, easy to install, one-size design preferred for detecting wear upon a cone section of a hydrocyclone. As with the wafer-style wireless electronic wear sensor 36, the electronics of the probe-style wireless electronic wear sensor 50 also enable the probe-style wireless electronic wear sensor 50 to detect the wear condition within the internal wear region of the hydrocyclone separator where it is located, create electronic data indicative of the wear condition and transmit electronic data indicative of the wear condition wirelessly for being received and delivered to an associated hydrocyclone control system. Again, the battery within the wireless electronic wear sensor 50 should preferably be of suitable design and capacity to last for a significant time before requiring recharging or replacement, such as over one year. Again, each wireless electronic wear sensor 50 preferably includes its own electronic identification corresponding to a particular identified hydrocyclone separator location upon which it is applied.

The wireless electronic wear sensors 36 and 50 are also typically manufactured, shipped and incorporated into the hydrocyclone management system in a dormant "standby" mode to preserve battery life, and are capable of being activated or "awakened" when a suitable controller or other electronic device is placed in close proximity to, or otherwise initiates communication with, the wireless electronic wear sensors 36 and 50, as discussed in further detail below. Again, a dormant, "standby" mode is used in the electronic wear sensors 36 and 50 to conserve battery life when the sensors are not in active use, by not requiring electronic components in the wireless electronic wear sensors 36 and 50 to always be powered. Again, the activation or "awakening" of the electronic wear sensors 36 and 50 may be performed by any suitable electronic, magnetic or other means, also known as a trigger, including exposure to a magnetic field or electronic signal provided or transmitted by an electronic controller or other control device. Accordingly, the wireless electronic wear sensors 36 and 50 include a specialized micro-power sensor (not shown) for detecting the magnetic field or electronic signal provided by the electronic controller or other control device. Upon activation, the wireless electronic wear sensors 36 and 50 enter into a synchronization or linking mode with the electronic controller or other control device, to coordinate communications information, radio frequency bands, and sensor-specific information. After synchronization or linking, the transmission of electronic wear data to the electronic controller or other control device begins, also as discussed in further detail below. If the wireless electronic wear sensors 36 and 50 are taken out of active service, they can be returned to the power-saving dormant storage mode by commands from the electronic controller or other control device.

Figure 10:
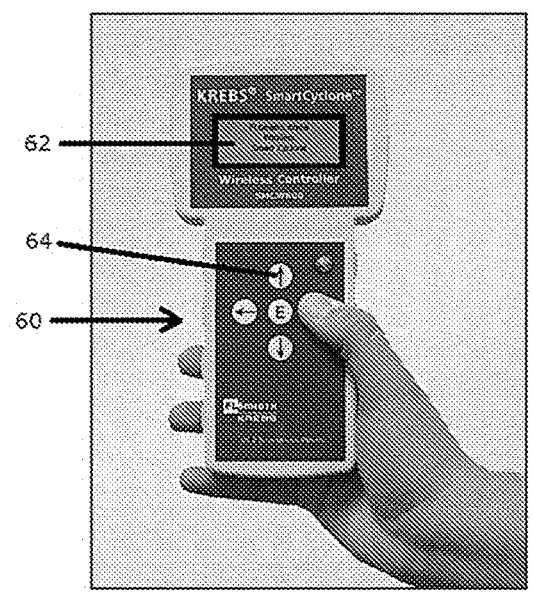
FIG. 10 is a front view of a wireless hydrocyclone controller according to the present invention.

Referring now to FIG. 10, the hydrocyclone management system includes a wireless hydrocyclone controller, generally at 60, which is preferably hand-portable and includes a display 62 suitable for providing operational information about, and for calibrating, roping and/or wear data being received or delivered. The wireless hydrocyclone controller 60 also includes a series of controls 64, shown in the form of pushbuttons, for controlling the various functions of the device. The wireless hydrocyclone controller 60 also includes an internal radio frequency (RF) receiver (not shown) suitable for receiving electronic data, an internal radio frequency (RF) transmitter (not shown) suitable for transmitting electronic data, an internal antenna (not shown) suitable for facilitating data reception and transmission and a replaceable or rechargeable internal battery of suitable durability (not shown) for powering the device.

The wireless hydrocyclone controller 60 also includes means for activating or "awakening" the wireless electronic roping sensor 10 and the wireless electronic wear sensors 36 and 50 from their dormant, "standby" mode. Preferably, the wireless hydrocyclone controller 60 includes an internal magnet, an internal electronic signal transmitter or other suitable signaling emitter (not shown) that is operable as a trigger for activating the wireless electronic roping sensor 10 and the wireless electronic wear sensors 36 and 50 from their dormant, "standby" mode when held in close proximity (such as a few feet) to the wireless electronic roping sensor 10 and the wireless electronic wear sensors 36 and 50 on an individual basis, by exposure to the trigger, so that they can then synchronize or link with the wireless hydrocyclone controller 60. Accordingly, the presence of the wireless hydrocyclone controller 60 in close proximity to the wireless electronic roping sensor 10 and the wireless electronic wear sensors 36 and 50 allows for the magnetic field, electronic signal or other suitable signal provided by the wireless hydrocyclone controller 60 to be detected or received by the wireless electronic roping sensor 10 and the wireless electronic wear sensors 36 and 50, which results in activation and preparation of the wireless electronic roping sensor 10 and the wireless electronic wear sensors 36 and 50 for subsequent operation.

The wireless hydrocyclone controller 60 is preferably operable for wirelessly receiving and calibrating electronic data indicative of normal, transitional, and roping conditions transmitted from all wireless electronic roping sensors 10 disposed upon a single hydrocyclone or within a manifold group of hydrocyclones. The wireless hydrocyclone controller 60 is also preferably operable for wirelessly receiving and calibrating electronic data indicative of a wear condition transmitted from all wireless electronic wear sensors 36 or 50 disposed upon a single hydrocyclone or within a manifold group of hydrocyclones. In both cases, the wireless hydrocyclone controller 60 is typically able to receive such electronic data when held in close proximity (such as a few feet) to the wireless electronic roping sensors 10 or the wireless electronic wear sensors 36 or 50, which may also activate or "wake up" the sensors from a standby condition, although it will be appreciated that other data receipt arrangements may be contemplated, such as receipt from a remote location not in proximity to the sensors, if the transmitting capability of the sensors so provides.

The wireless hydrocyclone controller 60 is also preferably operable for being placed in one or more docking stations (not shown) during both operation and standby or charging activities. Each docking station is preferably wired via suitable cable to the associated hydrocyclone control system, such that when the wireless hydrocyclone controller 60 is placed into a docking station, the roping and/or wear condition data gathered sequentially from the individual roping and wear sensors is automatically delivered to a dedicated computer workstation operable for controlling operational parameters of the hydrocyclone separator or separators or other suitable equipment forming part of the associated hydrocyclone control system. Accordingly, in this way, the wireless hydrocyclone controller 60 is operable for delivering electronic data indicative of normal, transitional, and roping conditions and electronic data indicative of a wear condition to the hydrocyclone control system. However, it will be appreciated that the wireless hydrocyclone controller 60 may deliver such electronic roping and/or wear data to any suitable component of a hydrocyclone control system, including central controllers, manifold controllers or a computer workstation.

Once delivered to the hydrocyclone control system, the electronic roping and/or wear data may be interpreted by control room operators so that adjustments of controlling operational parameters of the hydrocyclone separator or separators or other suitable equipment forming part of the associated hydrocyclone control system (such as flow rate, feed pressure, water addition, on/off operation and number of operating hydrocyclones) may be made by the control room operators. Alternatively, and preferably, once delivered to the hydrocyclone control system, the electronic roping and/or wear data may be inserted into an automated computerized routine within the hydrocyclone control system so that adjustments of controlling operational parameters of the hydrocyclone separator or separators or other suitable equipment forming part of the associated hydrocyclone control system (such as flow rate, feed pressure, water addition, on/off operation and number of operating hydrocyclones) may be made automatically by the hydrocyclone control system (such as by a dedicated computer workstation).

The present invention also provides a method of wirelessly detecting normal, transitional and roping conditions within a hydrocyclone separator or a group of hydrocyclones (such as within a manifold) during operation, and communicating electronic data corresponding to such roping conditions to an associated hydrocyclone control system. The method comprises the steps of providing a wireless electronic roping sensor 10 disposed in communication with a flow region of a hydrocyclone separator, and operable for detecting normal, transitional and roping conditions within the hydrocyclone separator, creating electronic data indicative of the roping conditions and transmitting the electronic data indicative of the roping conditions wirelessly for delivery to an associated hydrocyclone control system.

The method further comprises providing an electronic wireless controller 60 operable for wirelessly receiving electronic data indicative of normal, transitional and roping conditions transmitted from the wireless electronic roping sensor 10, and operable for delivering the electronic data indicative of the roping conditions to the hydrocyclone control system. The method further comprises placing the electronic wireless controller 60 in proximity to the wireless electronic roping sensor 10, so as to activate and synchronize the wireless electronic roping sensor from a standby condition, receive the electronic data created by, and transmitted by, the wireless electronic roping sensor; and causing the electronic wireless controller to deliver the electronic data indicative of the roping conditions received from the wireless electronic roping sensor to the associated hydrocyclone control system.

The present invention also provides a method of wirelessly detecting a wear condition within a hydrocyclone separator a group of hydrocyclones (such as within a manifold) during operation, and communicating electronic data corresponding to a wear condition to an associated hydrocyclone control system. The method comprises the steps of providing a wireless electronic wear sensor 36 or 50 disposed in communication with an internal wear region of a hydrocyclone separator, and operable for detecting a wear condition within the internal wear region, creating electronic data indicative of the wear condition and transmitting the electronic data indicative of the wear condition wirelessly for delivery to an associated hydrocyclone control system.

The method further comprises providing an electronic wireless controller 60 operable for wirelessly receiving electronic data indicative of a wear condition transmitted from the wireless electronic wear sensor, and operable for delivering the electronic data indicative of the wear condition to the hydrocyclone control system. The method further comprises placing the electronic wireless controller 60 in proximity to the wireless electronic wear sensor 36 or 50, so as to activate and synchronize the wireless electronic wear sensor from a standby condition, receive the electronic data created by, and transmitted by, said wireless electronic wear sensor; and causing the electronic wireless controller 60 to wirelessly deliver the electronic data indicative of the wear condition received from the wireless electronic wear sensor to the associated hydrocyclone control system.

The method may further comprise the electronic roping and/or wear data delivered to the hydrocyclone control system causing manual adjustment, by a hydrocyclone control operator, of at least one controlling operational parameters of the hydrocyclone separator or separators or other suitable equipment forming part of the associated hydrocyclone control system (such as flow rate, feed pressure, water addition, on/off operation and number of operating hydrocyclones) by the hydrocyclone control system (such as by a dedicated computer workstation), in the event that a condition requiring adjustment is detected. Alternatively, the method may further comprise inserting the electronic roping and/or wear data delivered to the hydrocyclone control system into an automated computerized routine within the hydrocyclone control system so as to cause automatic adjustments of controlling operational parameters of the hydrocyclone separator or separators or other suitable equipment forming part of the associated hydrocyclone control system (such as flow rate, feed pressure, water addition, on/off operation and number of operating hydrocyclones) by the hydrocyclone control system (such as by a dedicated computer workstation), in the event that a condition requiring adjustment is detected.

The present invention provides a convenient, compact system and method for monitoring roping and wear in hydrocyclones. It maximizes the life of hydrocyclone liners, allows for planning of hydrocyclone maintenance activities, allows hydrocyclones to be easily taken out of service for maintenance, assists operators in preventing roping conditions in hydrocyclones, and allows for more efficient corrective action when roping does occur. It replaces existing wired roping and wear sensors, eliminates the need for node units corresponding to the various cyclones, reduces the number of required manifold controllers, reduces the wiring required for connecting these items and provides wireless detection and communication of wear data from the sensors to the manifold controllers for forwarding to a control room workstation. Accordingly, the present invention promptly detects and allows for correction of roping conditions to prevent or reduce their adverse characteristics, including the obstruction of hydrocyclone underflow, passing the entire hydrocyclone flow through its overflow outlet, the redirecting of coarse solids normally intended for being sent to a mill via the hydrocyclone's underflow output through the hydrocyclone's overflow to a flotation cell, and the accompanying accumulation of excessive coarse solids in the flotation cell, which require shutdown and cleaning, and which can be very expensive and time-consuming, and can significantly delay the intended processing, while also reducing the efficiency of separation processes such as mineral extraction and recovery.

The disclosure of every patent, patent application, and publication cited herein is hereby incorporated herein by reference in its entirety.

While this subject matter has been disclosed with reference to specific embodiments, it is apparent that other embodiments and variations can be devised by others skilled in the art without departing from the true spirit and scope of the subject matter described herein. The appended claims include all such embodiments and equivalent variations.

The invention claimed is:

1. A hydrocyclone management system for a hydrocyclone separator comprising:
   a wireless electronic roping sensor communicating with a flow region of said hydrocyclone separator, and being configured to detect normal, transitional and roping conditions within said hydrocyclone separator;
   a wireless electronic wear sensor communicating with an internal wear region of said hydrocyclone separator, and being configured to detect a wear condition within said internal wear region;
   An electronic wireless controller configured to wirelessly receive electronic data indicative of said normal, transitional and roping conditions transmitted from said wireless electronic roping sensor and being further configured to wirelessly receive electronic data indicative of said wear condition transmitted from said wireless electronic wear sensor, said electronic wireless controller being hand-portable and battery-powered and comprising a magnet configured to provide a magnetic field as a trigger;
   wherein the wireless electronic roping sensor comprises a micro-power sensor configured to detect the magnetic field and activate from a dormant standby mode when the electronic wireless controller is placed in close proximity to the wireless electronic roping sensor, and the wireless electronic roping sensor comprises a radio frequency (RF) transmitter configured to enter into a synchronization or linking mode with the electronic wireless controller upon activation;
   wherein the wireless electronic wear sensor comprises a micro-power sensor configured to detect the magnetic field and activate when the electronic wireless controller is placed in close proximity to the wireless electronic wear sensor, and the wireless electronic wear sensor comprises a radio frequency (RF) transmitter configured to enter into a synchronization or linking mode with the electronic wireless controller upon activation.

2. The hydrocyclone management system according to claim 1, further comprising a hydrocyclone control system communicating with the electronic wireless controller, wherein the electronic wireless controller is configured to deliver said electronic data indicative of said normal, transitional and roping conditions and said electronic data indicative of said wear condition to said hydrocyclone control system to cause adjustment of at least one controlling operational parameter of said hydrocyclone separator; the at least one controlling operational parameter being selected from the group consisting of: flow rate, feed pressure, water addition, and on/off Operation of the hydrocyclone separator.

3. The hydrocyclone management system according to claim 1, wherein said flow region of said hydrocyclone separator is selected from the group consisting of an underflow outlet, and an overflow outlet.

4. The hydrocyclone management system according to claim 1, wherein said wireless electronic roping sensor and said wireless electronic wear sensor are both battery-powered.

5. The hydrocyclone management system according to claim 1, further comprising a docking station; the electronic wireless controller being configured to be placed in the docking station; the docking station being configured to communicate with a computer workstation that is configured to control operational parameters of said hydrocyclone separator.

6. The hydrocyclone management system according to claim 1, wherein said electronic wireless controller is placed in proximity to said wireless electronic roping sensor.

7. The hydrocyclone management system according to claim 1, wherein said electronic wireless controller is placed in proximity to said wireless electronic wear sensor.

8. The hydrocyclone management system according to claim 1, wherein said hydrocyclone separator performs a liquid/solid separation.

9. The hydrocyclone management system according to claim 1, wherein the wireless electronic roping sensor comprises:
   a housing; a digital electronics printed circuit board; a shield; an analog printed circuit board within the shield; a piezo element within the shield; and a battery.

10. The hydrocyclone management system according to claim 1, wherein the wireless electronic roping sensor comprises:
    a housing; a battery; an electronic printed circuit board; and the radio frequency (RF) transmitter on the electronic printed circuit board.

* * * * *